(12) United States Patent
Mishra et al.

(10) Patent No.: US 12,493,941 B2
(45) Date of Patent: Dec. 9, 2025

(54) FLANGE INTEGRITY CLASSIFICATION USING ARTIFICIAL INTELLIGENCE

(71) Applicant: Saudi Arabian Oil Company, Dhahran (SA)

(72) Inventors: Siddharth Mishra, Dhahran (SA); Hassane Trigui, Jeddah (SA); Sahejad Patel, Thuwal (SA); Yazeed Alnumay, Thuwal (SA); Ahmed Albrahim, Thuwal (SA); Ali Alrasheed, Thuwal (SA); Mohammed Alsheikh, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 375 days.

(21) Appl. No.: 17/702,478

(22) Filed: Mar. 23, 2022

(65) Prior Publication Data

US 2023/0306572 A1    Sep. 28, 2023

(51) Int. Cl.
G06T 7/00    (2017.01)
G06T 19/00    (2011.01)

(52) U.S. Cl.
CPC .......... *G06T 7/0002* (2013.01); *G06T 19/006* (2013.01); *G06T 2207/20084* (2013.01)

(58) Field of Classification Search
CPC .............. G06T 7/0002; G06T 19/006; G06T 2207/20084; G06V 20/20; G06V 2201/06; G06V 10/82; G06V 10/26
USPC ............................................. 382/100
See application file for complete search history.

(56) References Cited

U.S. PATENT DOCUMENTS

| 11,468,551 | B1* | 10/2022 | Amouie | G06V 10/774 |
| 2016/0358041 | A1* | 12/2016 | Venkataraman | G06F 18/2411 |
| 2017/0106885 | A1* | 4/2017 | Singh | B61L 23/045 |
| 2019/0294883 | A1* | 9/2019 | Pathak | F01D 5/005 |
| 2020/0005422 | A1* | 1/2020 | Subramanian | G06T 7/194 |
| 2020/0394784 | A1* | 12/2020 | Toth | G06T 7/0004 |
| 2021/0192716 | A1* | 6/2021 | Kohler | G06F 18/2431 |
| 2021/0295543 | A1* | 9/2021 | Guan | G06T 7/001 |
| 2023/0052634 | A1* | 2/2023 | Tomblin | B29C 65/8253 |
| 2023/0078218 | A1* | 3/2023 | Wang | G06N 3/098 |
| | | | | 706/12 |

(Continued)

FOREIGN PATENT DOCUMENTS

| CN | 112508939 | 3/2021 |
| WO | WO 2021071859 | 4/2021 |

OTHER PUBLICATIONS

Pipeline Flange Defect Detection based on Deep Learning, by Anyao Jiang, Jun Liu, ICASIT 2020: International conference on Aviation Safety and Information Technology, Oct. 14-16, 2020. DOI: 10.1145/3434581.3434672 (Year: 2020).*

(Continued)

*Primary Examiner* — Jennifer Mehmood
*Assistant Examiner* — Heath E. Wells
(74) *Attorney, Agent, or Firm* — Fish & Richardson P.C.

(57) ABSTRACT

A computer-implemented method for flange integrity classification using artificial intelligence is described. The method includes obtaining images of a flange, wherein an image of the images is captured at a predetermined angle of image capture. The method includes classifying a condition of the flange using a trained machine learning model. Further, the method includes rendering an indication of the condition of the flange.

21 Claims, 7 Drawing Sheets

(56) References Cited

U.S. PATENT DOCUMENTS

| | | | |
|---|---|---|---|
| 2024/0083478 A1* | 3/2024 | Liu | G06V 20/52 |
| 2024/0410534 A1 | 12/2024 | Alrasheed et al. | |
| 2025/0191127 A1 | 6/2025 | Patel et al. | |

OTHER PUBLICATIONS

Arebi et al., "Misalignment Detection Using a Wireless Sensor Mounted on a Rotating Shaft," COMDEM 2011, proceedings of the 24th International Congress on Condition Monitoring and Diagnostics Engineering Management, May-Jun. 2011, 1289-1299, 12 pages.

Bouattour et al., "A Smart Sensing Architecture for Misalignment Measurements," 2018 IEEE Sensors, Oct. 2018, 1-4, 4 pages.

Cha et al., "Vision-based detection of loosened bolts using the Hough transform and support vector machines," Automation in Construction, Nov. 2016, 71:2 (181-188), 8 pages.

eddyfi.com [online], "Gekko," 2022, retrieved on Feb. 17, 2022, retrieved from URL <https://www.eddyfi.com/en/product/gekko>, 14 pages.

eddyfi.com [online], "NII-Non-intrusive Inspection: Vessels, pressure systems and associated pipework," May 2019, retrieved on Feb. 17, 2022, retrieved from URL <https://www.eddyfi.com/doc/Pdf/NII-Non-Intrusive-Inspection-Vessel-Pipework-01.pdf>, 16 pages.

energy-robotics.com [online], "Brain-powering autonomous robots," retrieved on Feb. 17, 2022, retrieved from URL <https://www.energy-robotics.com/?gclid=EAIaIQobChMI7anz3PTN8QIVWxkGABIQ_AGBEAMYAiAAEgI7M_D_BwE>, 5 pages.

Huynh et al., "Quasi-autonomous bolt-loosening detection method using vision-based deep learning and image processing," Automation in Construction, Sep. 2019, 105:102844, 18 pages.

Jiang et al., "Pipeline Flange Defect Detection based on Deep Learning," ICASIT 2020: 2020 International Conference on Aviation Safety and Information Technology, Oct. 2020, 296-300, 5 pages.

jireh.com [online], "Stix-Flange Scanner," 2022, retrieved on Feb. 17, 2022, retrieved from URL <https://www.jireh.com/products/stix-flange-scanner/>, 12 pages.

Kong et al., "Image registration-based bolt loosening detection of steel joints," Sensors, Mar. 2018, 18:4 (1000), 20 pages.

Kong et al., "Tapping and listening: A new approach to bolt looseness monitoring," Smart Materials and Structures, Jun. 2018, 27:7 (07LT02), 10 pages.

Nguyen et al., "Bolt-loosening identification of bolt connections by vision image-based technique," Nondestructive Characterization and Monitoring of Advanced Materials, Aerospace, and Civil Infrastructure, Apr. 2016, 9804:980413, 17 pages.

Nikravesh et al., "A review paper on looseness detection methods in bolted structures," Latin American Journal of Solids and Structures, Dec. 2017, 14:12 (2153-2176), 24 pages.

nusahendheld3d.com [online], "Easy Laser XT550-EX/ATEX Shaft Alignment," 2022, retrieved on Feb. 17, 2022, retrieved from URL <https://www.nusahendheld3d.com/easy-laser/new---easy-laser-xt550---exatex-shaft-alignment>, 5 pages.

olympus.com [online], "OmniScan MX2," 2022, retrieved on Feb. 17, 2022, retrieved from URL <https://www.olympus-ims.com/en/omniscan-mx2/>, 6 pages.

Park et al., "Vision-based technique for bolt-loosening detection in wind turbine tower," Wind and Structures, 2015, 21:6 (709-726), 19 pages.

Pham et al., "Bolt-Loosening Monitoring Framework Using an Image-Based Deep Learning and Graphical Model," Sensors, Jun. 2020, 20:12 (3382), 19 pages.

Ramana et al., "Fully automated vision-based loosened bolt detection using the Viola-Jones algorithm." Structural Health Monitoring, Feb. 2018, 18:2 (422-434), 13 pages.

Ren et al., "A smart "shear sensing" bolt based on FBG sensors," Measurement, Jul. 2018, 122:240-246, 15 pages.

Shen et al., "Automatic system design for flange surface quality inspection with a bionic motion-vision paradigm," Journal of the Chinese Institute of Engineers, Sep. 2020, 43:8, 819-830, 13 pages.

sonotronndt.com [online], "Isonic 3510 Brochure," Nov. 2021, retrieved on Feb. 17, 2022, retrieved from URL <http://www.sonotronndt.com/Brochures/brochure3510.pdf>, 116 pages.

stork.com [online], "Flange Integrity Management," 2017, retrieved on Feb. 17, 2022, retrieved from URL <https://www.stork.com/downloads/Flange_Integrity_Management_Brochure.pdf>, 5 pages.

Wang et al., "Design of a New Vision-based Method for the Bolts Looseness Detection in Flange Connections," IEEE Transactions on Industrial Electronics, Feb. 2020, 67(2):1366-1375, 10 pages.

Wang et al., "Modeling and analysis of an impact-acoustic method for bolt looseness identification," Mechanical Systems and Signal Processing, Nov. 2019, 133:106249, 12 pages.

Wang et al., "Review of bolted connection monitoring," International Journal of Distributed Sensor Networks, Dec. 2013, 9(12):871213, 9 pages.

Yin et al., "A smart washer for bolt looseness monitoring based on piezoelectric active sensing method," Applied Sciences, Oct. 2016, 6(11):320, 10 pages.

zetec.com [online], "Choose Topaz Phased Array Ultrasound Testing (PAUT) Instruments for your NDT inspection needs," 2022, retrieved on Feb. 17, 2022, retrieved from URL <https://www.zetec.com/topaz/>, 3 pages.

Alvin "Train your Model Overnight on Remote Terminal with Linux Screen," Towards Data Science, Feb. 26, 2022, pp. 1-14.

International Search Report and Written Opinion in International Appln. No. PCT/US2023/015884, mailed on Jun. 26, 2023, 14 pages.

Zhou et al., "Review of research on 17 lightweight convolutional neural networks," 2020 IEEE 5th Information Technology and Mechatronics Engineering Conference (ITOEC 2020), Jun. 12, 2020, pp. 1713-1720, 9 pages.

Alnumay et al., "Synthetic Data Generation for Machine Learning Applications in the Energy Industry," presented at the ADIPEC, Abu Dhabi, UAE, Nov. 2022, 2 pages (Abstract only).

asme.org [online], "ASME B16.5: Pipe Flanges and Flange Fittings., NPS 1/2 through NPS 24, Metric/Inch Standard," 2021, retrieved on May 31, 2024, retrieved from URL <https://www.asme.org/codes-standards/find-codes-standards/b16-5-pipe-flanges-flanged-fittings-nps-1-2-nps-24-metric-inch-standard>, 2 pages.

Bordon et al., "Automatic detection of pipe-flange reflections in GPR data sections using supervised learning," Journal of Applied Geophysics, Sep. 2019, 34 pages.

Brenner et al., "RGB-D And Thermal Sensor Fusion: A Systematic Literature Review," arXiv preprint arXiv:2305.11427, Jul. 2023, 33 pages.

Debaque et al., "Thermal and visible image registration using deep homography," IEEE, 2022 25th International Conference on Information Fusion (Fusion) in Linköping, Sweden, Jul. 4-7, 2022, 10 pages.

Rachman et al., "Applications of machine learning in pipeline integrity management: A state-of-the-art review," International Journal of Pressure Vessels and Piping, Jun. 2021, 33 pages.

* cited by examiner

FLANGE INTEGRITY CLASSIFICATION USING ARTIFICIAL INTELLIGENCE

TECHNICAL FIELD

This disclosure relates generally to machine-learning based flange integrity classification.

BACKGROUND

Flanges include projecting collars that are physically coupled to seal a pressurized vessel or pipe. Multiple flanges are used in a pipeline. Standards applicable to flanges are promulgated by organizations such as the American Society of Mechanical Engineers (ASME) and American National Standards Institute (ANSI).

SUMMARY

An embodiment described herein provides a method for flange integrity classification using artificial intelligence. The method includes obtaining images of a flange, wherein the images are captured at a predetermined angle of image capture. The method includes classifying a condition of the flange using a trained machine learning model. The method also includes rendering an indication of the condition of the flange.

An embodiment described herein provides an apparatus comprising a non-transitory, computer readable, storage medium that stores instructions that, when executed by at least one processor, cause the at least one processor to perform operations. The operations include obtaining images of a flange, wherein the images are captured at a predetermined angle of image capture. The operations include classifying a condition of the flange using a trained machine learning model. The operations also include rendering an indication of the condition of the flange.

An embodiment described herein provides a system. The system comprises one or more memory modules and one or more hardware processors communicably coupled to the one or more memory modules. The one or more hardware processors is configured to execute instructions stored on the one or more memory models to perform operations. The operations include obtaining images of a flange, wherein the images are captured at a predetermined angle of image capture. The operations include classifying a condition of the flange using a trained machine learning model, wherein a machine learning model is trained to classify the condition of the flange using synthetic images. Additionally, the operations include rendering an indication of the condition of the flange.

DETAILED DESCRIPTION

Figure 1:
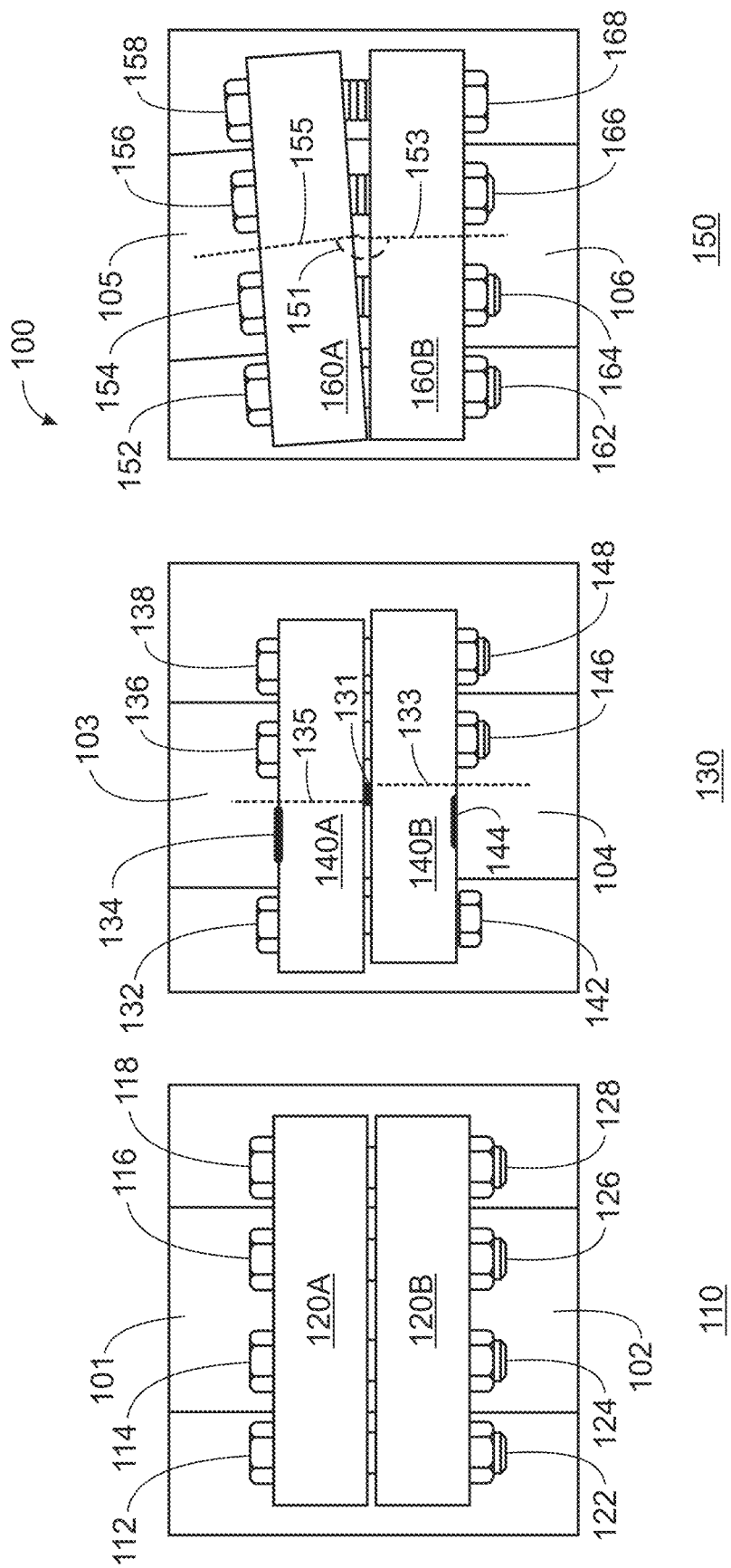
FIG. 1 is an illustration of coupled flanges.

Flanges enable connections between pipes of pipeline systems that transport various materials, such as oil, gas, water, and the like. Additionally, flanges can securely seal pressurized vessels that store various materials. A flange can include two flange collars bolted together using a set of bolts mated with corresponding nuts. A seal is created between the flange collars, enabling a strong joint or connection between two pipes. Ensuring the integrity of flanges is vital to maintaining a safe pipeline or pressurized vessel. In some cases, inspections of flanges in the field are conducted infrequently, since traditional inspections require that a trained operator travel to the pipeline and visually inspect the flanges. Additionally, once on-site, in traditional inspections the operator may find that flanges are located in difficult to view or hidden locations due to the design of the pipeline. Further, inexperienced operators are often unable to properly evaluate conditions of the flanges in traditional inspections. Accordingly, in traditional techniques operators require extensive, costly, and time consuming training in order to evaluate flanges.

Embodiments described herein enable flange integrity classification using artificial intelligence. In particular, the present techniques use enable an automated assessment of the integrity and health of one or more flanges. Using an industrial tablet pre-installed with a mobile application, a systematic and automated procedure to assess the integrity and health of flanges is provided. In examples, the application prompts an operator to visit specific flanges and capture images from specified angles. The application, using these images, will determine if any conditions are present using a trained machine learning model.

Traditional flange integrity classification is limited to detection of loosened bolts by analyzing a change in an angle of the bolt over time or acoustic inspection techniques. Other traditional techniques use Phase Array Ultrasonic Testing (PHAT), where a probe is focused and electronically swept to scan an area of interest, without moving the probe. The use of the probe consumes a relatively long period of time for inspection, and a trained operator is required to operate the probe and interpret the results. As a result, traditional techniques are limited to testing for loosened bolts or using ultrasonic testing. The present techniques detect a variety of flange conditions that can cause future leaks, and do not require a trained operator. Image capture is performed to obtain images of a flange from multiple angles. For example, an untrained person (e.g., without specialized knowledge) captures images of flanges from multiple angles as instructed by the mobile application. In some embodiments, the mobile application can used for training of operators. In examples, an electronic device (e.g., a robot, drone) captures images of flanges from multiple angles as instructed by the mobile application. A trained machine learning model takes the captured images as input, and outputs a predicted condition of the flanges.

FIG. 1 is an illustration of coupled flanges 100. In some embodiments, the coupled flanges 100 are included in a pipeline. For example, the pipeline system can be a gathering system, transmission system, or and distribution system with multiple flanges forming joints or connections across pipes of the pipeline. The flanges are often under high pressure and can transport hazardous or flammable material. Accordingly, flanges in poor condition can create a dangerous environment.

In the example of FIG. 1, the coupled flanges 100 include a first coupled flange pair 110, a second coupled flange pair 130, and a third coupled flange pair 150. The first coupled flange pair 110 includes a number of bolts 112, 114, 116, and 118. The bolts extend through bolt holes in collars 120A and 120B of the coupled flange pair 110. A number of nuts 122, 124, 126, and 128 receive the threaded end of the bolts 112, 114, 116, and 118. Tightening the nuts 122, 124, 126, and 128 secures the collars 120A and 120B of the coupled flange pair 110, creating a seal between pipe 101 and pipe 102.

In the example of FIG. 1, the second coupled flange pair 130 includes a number of bolts 132, 136, and 138. The bolts extend through bolt holes in collars 140A and 140B of the coupled flange pair 130. A number of nuts 142, 146, and 148 receive the threaded end of the bolts 132, 136, and 138. The nuts 142, 146, and 148 are threaded onto respective bolts 132, 136, and 138.

The coupled flange pair 130 exhibits a number of conditions. In examples, a condition refers to a state of a flange with regard to its appearance, quality, or working order. In examples, the condition is a normal, healthy condition wherein the flange is configured according to predetermined maintenance instructions and bolt tightening data (e.g., bolting patterns, torque and tensioning figures, procedures, techniques and recommended controlled bolting equipment). In some embodiments, a normal condition is determined based on a flange type and standards promulgated by organizations such as the American Society of Mechanical Engineers (ASME) and American National Standards Institute (ANSI). In some embodiments, the condition is poor or unhealthy, where the flange exhibits defects that reduces the integrity of the coupled flange. In examples, defects include short bolting, missing bolts, angular or parallel misalignment of the flange heads, missing screws, and the like. In some embodiments, a condition of the flange is critical. A flange in critical condition exhibits a severe flange abnormality that can cause immediate disruption to a system that includes the flange.

A short bolting defect is illustrated using bolt 132 and nut 142. The short bolting defect is indicated by the bolt 132 being short and failing to extend fully through bolt holes of the collar 140A and the collar 140B. At bolt holes 134 and 144, a missing bolt defect is illustrated. A missing bolt is indicated by bolt holes without bolts, and reduces the integrity of the coupled flanges. The collars 140A and 140B of the coupled flange pair 130 are misaligned as shown at reference number 131. In particular, the collar 140A and collar 140B show a parallel misalignment, which is indicated by an offset 131 between a centerline 135 of the collar 140A and a centerline 133 of the collar 140B.

The third coupled flange pair 150 includes a number of bolts 152, 154, 156, and 158. The bolts extend through collars 160A and 160B of the third coupled flange pair 150. A number of nuts 162, 164, 166, and 168 receive the threaded end of the bolts 152, 154, 156, and 158. The nuts 162, 164, 166, and 168 are threaded onto respective bolts 152, 154, 156, and 158. The collars 160A and 160B of the coupled flange pair 150 are misaligned as shown at reference number 151. In particular, the collar 160A and collar 160B show an angular misalignment, which is indicated by an angle 151 between a centerline 155 of the collar 160A and a centerline 153 of the collar 160B.

Other defects of a flange include, for example, scratches, gouges, pits, and dents. In examples, scratches are caused by contact with hard, abrasive materials, and can result from mishandling in transit or from the removal of protective coatings. In examples, gouges are created by a dull object dragging across the flange face, such as a screwdriver, flange. Gouges can be in transit from the fabrication plant to site, or during commissioning. Pits are small rounded areas of material loss, sometimes in groups and caused by corrosion. In examples, pits are created after the flanges are operational for a period of time. Similarly, dents can be caused during the installation and commissioning phases through impact with equipment such as cables, rigging and positioning of mating flanges.

For ease of illustration, the defects in FIG. 1 are shown as visually observed by the human eye. However, in some embodiments, defects associated with the coupled flanges are small and slight as to not be visible to the human eye. Additionally, a single flange or a flange pair can exhibit any number of defects. For example, a flange pair can exhibit missing bolts, short bolts, parallel misalignment, angular misalignment, scratches, gouges, pits, dents, and loose bolts either alone or in various combinations.

The present techniques include an intelligent system that detects faulty flanges that could eventually leak. Flanges that are not tightened well, have loosened bolts, missing bolts, or short bolting do not retain sufficient force to prevent inner liquid from leaking through the flanges, and are more susceptible to leaks. Moreover, flanges that feature angular or parallel misalignment have higher probability to exhibit leaks than perfectly aligned flanges. Hence, detecting these faults or anomalies in flanges as early as possible reduces the likelihood of leak incidents as well as maintenance costs associated with damaged flanges.

For ease of description, the flanges described herein are described generally with flange collars and a number of bolts. However, the flanges can be of many different types, such as Weld Neck Raised Face (WNRF), Socket Weld (SW), Slip-On Flange, Flat Faced (FF), Lap Joint, Ring Joint, Threaded Flange, Reducing Flange, Blind Flange, and the like. Face types of the flanges include, for example, flat face, raised face, ring joint face, tongue and groove, and male and female faces. Additionally, in examples, the flanges can include a number of finishes, such as serrated or smooth. Flange integrity classification of various types of flanges is enabled by the present techniques, as the basis of anomaly/defect identification is image analytics augmented with machine learning capabilities.

Figure 2:
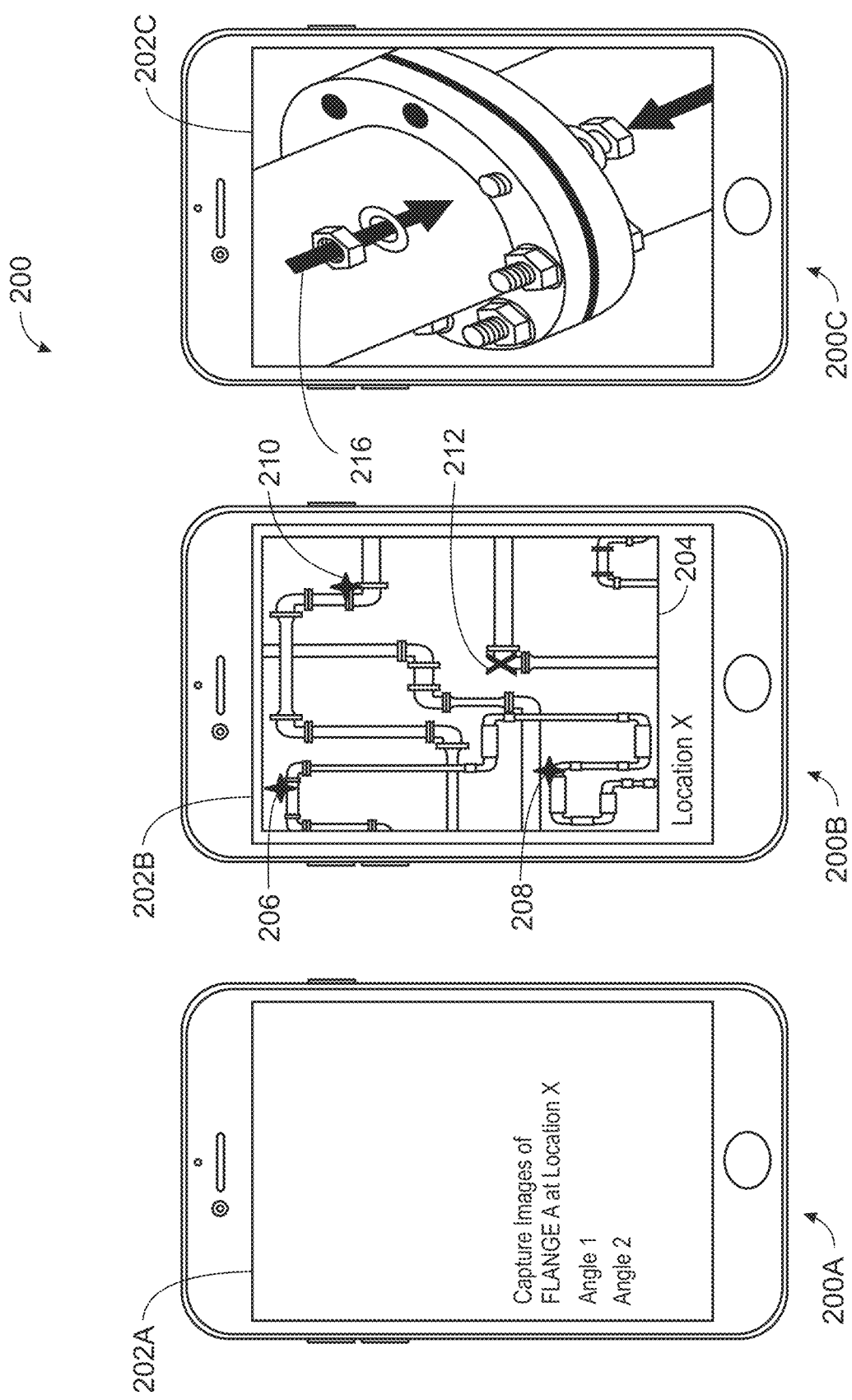
FIG. 2 shows a series of screenshots from a mobile application executing on an industrial tablet.

FIG. 2 shows a series of mobile application screenshots via displays 202A, 202B, and 202C (collectively referred to as displays 202) rendered at respective industrial tablets 200A, 200B, and 200C (collectively referred to as industrial tablets 200). For ease of description, the mobile application is described as executing on the industrial tablets 200. However, the mobile application according to the present techniques can be executed on any electronic device, such as a tablet, laptop, desktop, commercial tablet, smartphone and the like. In some embodiments, the industrial tablets 200 include built in sensors that detect gas leaks, hazardous or flammable plumes, and the like. For ease of illustration, particular mobile application screenshots are illustrated. However, the mobile application according to the present techniques can have any number of screenshots corresponding to rendered prompts, information, and instructions described herein. Further, the mobile application is not limited to the visual display of prompts, information, and instructions. In examples, the mobile application can generate prompts, information, and instructions using output devices including but not limited to speakers, remote displays, light indicators (e.g., traffic lights). Further, the mobile application can output haptic feedback via the industrial tablet, such as vibrations, to guide an operator.

In some embodiments, the mobile application has the ability to measure a wide multitude of flange sizes in different locations and conditions. The mobile application can detect a flange in an image and, if present, defects with their respective locations on an image. In examples, a first industrial tablet 200A includes a display 202A. A prompt to instruct a user to capture images of a flange is rendered on the display 202A. In some embodiments, the prompt includes instructions for image capture of a flange from predetermined angles or positions. In some embodiments, the predetermined angle of image capture refers to enabling panoramic views of a flange joint connection to ascertain maintenance job precision enabling the application to evaluate the flange joint and identify defects, if any. For example, identification of parallel/planar misalignment uses predetermined angles of image capture relative to the flange that captures a front view, side view and top view of the flange.

In FIG. 2, a second industrial tablet 200B includes a display 202B. A map 204 is rendered on the display 202B. The map 204 shows the flanges that operator needs to capture and the flanges that have already been captured for inspection. In the example of FIG. 2, locations 206, 208, and 210 that have been previously visited by the operator are marked using an item rendered on top of the map 204. In some embodiments, the map 204 is a real world image of the system, with augmented reality elements superimposed on top of the image. In some embodiments, the map 204 is a digital map.

Step by step directions are provided to guide the operator towards a next flange location, positioned at location 212. The operator captures one or more images of the flange using an image capture mechanism (e.g., camera or camera sensor) of the industrial tablet. In the example of FIG. 2, the operator is guided to a next Flange A at Location X. The user can visit Flange A at Location X, and capture images of Flange A at Angle 1 and Angle 2 as prompted via display 202A. In some embodiments, on-screen instructions are rendered for training purposes. For example, an operator in training is guided by instructions generated by the mobile application. In some embodiments, the mobile application prompts the operator for further advanced capturing to acquire supplementary images of the flange. For example, if a defect is detected, the operator is prompted to capture additional images. This will facilitate a faster troubleshooting process in the means of abnormality severity level detection. In some embodiments, the operator is prompted to take additional images when a first set of captured images is of poor quality, blurry, dimly lit, or unfocused.

In some embodiments, the industrial tablet includes a GPS sensor that uses GPS a location of the industrial tablet to determine the particular flange being captured. Location identification of flanges is enabled through a Geographic Information System (GIS) feature of assets (e.g., linear assets, in particular considering pipeline is a linear asset). GIS/Linear Reference System data is strengthened with coordinates (latitude, longitude) to enable accurate tracing and mapping of the break flanges, valves, associated pipe fittings etc. to enable expedited services in operation and maintenance. Reversibly, since the location of the each flange is known, the industrial tablet could determine its GPS location using the embedded GPS sensor and subsequently determine at which flange the tablet is located. This can be used to immediately identify which flange in the system the operator is capturing. In some embodiments, the industrial tablet includes a scan functionality to scan a quick response (QR) code permanently attached to the flange, which includes the flange's unique identification number. QR code tags can be also equipped with radio frequency identification (RFID) tags for quicker identification of the flanges.

A third industrial tablet 200C includes a display 202C. An image of the flange is rendered with augmented reality elements superimposed atop of the flange A. As illustrated, nuts, washers, and bolts are shown with arrows as augmented reality elements 216. The present techniques use augmented reality to superimpose, in real time, detected defects on top of an image of the flange, along with other information. In examples, the other information is details about the flange joint which includes flange size and rating (e.g. size in inch diameter with pressure rating in pounds; gasket type, flange type, process fluid in the subject along with characteristics like pressure/flow/temperature etc.). This mobile application can also be connected in real-time with Distributed Control System (DCS) and Document Management System (DMS), etc. to enable accurate and quick data capturing for the subject flange joint under consideration. In some embodiments, the augmented reality elements are an indication of the condition of the flange. In examples, a short bolting defect is rendered using augmented reality elements showing a short bolt that fails to extend fully through bolt holes of the flange collars. A missing bolt defect is rendered using augmented reality elements showing bolt holes without bolts, and a parallel misalignment is rendered using augmented reality elements showing an offset between a centerlines of the flange collars. Similarly, an angular misalignment is rendered using augmented reality elements by showing an angle between a centerlines of the flange collars.

In some embodiments, an indication of the condition of the flange is rendered at industrial tablets 200 using message that provides the operator with the type defect. For example, the text can be one or more of "short bolt," "missing bolt," "loose bolt," "parallel misalignment," or "angular misalignment." In some embodiments, instructions to remedy the defect are provided to the operator. The industrial tablet renders a warning to operators when a severe flange abnormality is detected (e.g., missing screw or bolt, significant flange misalignment, missing gasket etc.)

To determine conditions of the flange, cameras of the industrial tablet (e.g., industrial tablets 200) capture images of the flange and apply a deep leaning algorithm that classifies flanges based on their physical arrangement. The defects occur externally with respect to the flange, and can be detected visually using a vision sensor (e.g., camera). In some embodiments, a recursive neural network deep learning algorithm is trained using properly labeled images of flanges in healthy and poor condition, and the machine learning model is trained to classify flanges. In examples, the machine learning models according to the present techniques are integrated on industrial tablets to support maintenance personnel (e.g., operators) in performing flange surveys and detecting anomalies that are intuitively visible. The maintenance personnel will direct the tablet's camera to flanges while the survey is performed, and the mobile application determines if the physical arrangement of the captured flanges meets predetermined specifications. In some embodiments, required specifications of the flanges are determined from a database of a Document Management System (DMS) of the subject operating facility. For example, a DMS of an operating facility is located on a centralized server. A clone of the database can be copied to a cloud server where other edge devices (tablets) can communicate. Additionally, partial copies of the database can also be stored locally on the tablet in case server is not reachable. The device hosting the mobile application is communicatively coupled to the DMS in online (Industrial WiFi)/offline mode to fetch the technical specifications.

The mobile application includes machine learning models trained to classify flange integrity. The machine learning model takes as input one or more images of flanges and outputs a classification of flange integrity. The classified flange integrity identifies conditions of the flange, including defects present at the flange. In some embodiments, the machine learning model is trained to classify flange integrity using images of the flanges as input, as described with respect to FIG. 3. In some embodiments, the machine learning model is trained to classify flange integrity by segmenting images of flanges and inputting the image segments to train the machine learning model, as described with respect to FIG. 4.

Figure 3:
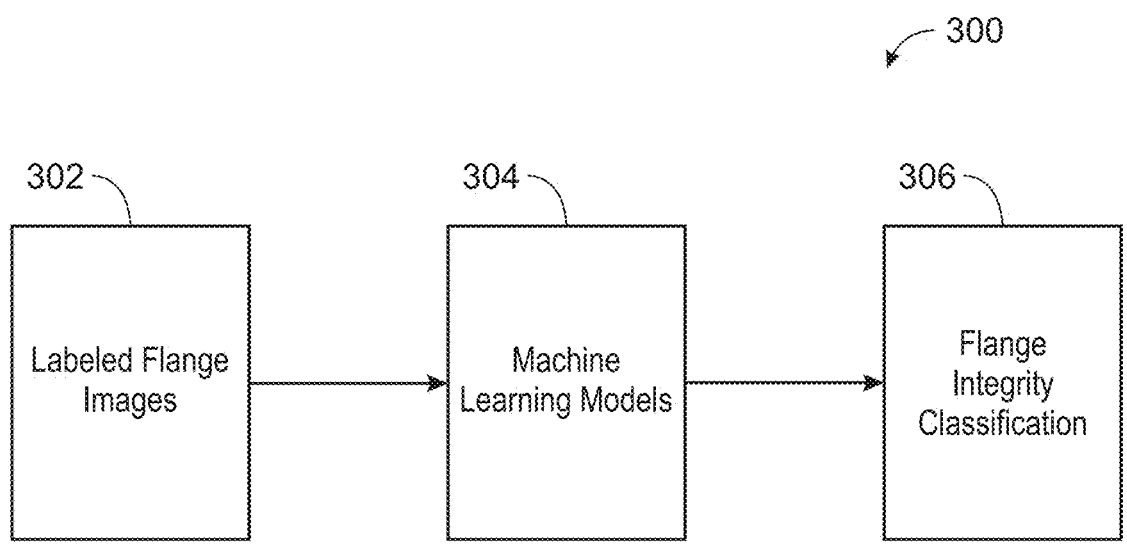
FIG. 3 is a block diagram of training a machine learning model for flange integrity classifications using artificial intelligence.

FIG. 3 is a block diagram of training a machine learning model for flange integrity classifications using artificial intelligence. Images of flanges with known defects are captured. The known defects are used to labels the images, and the labeled images are used to train the machine learning models at block 304. In some embodiments, the machine learning models are trained using synthetic images as described with respect to FIG. 5. The trained machine learning models output flange integrity classifications as indicated at block 306. In examples, the flange integrity classifications include defects/abnormalities of the flange and a bounding box associated with each respective defect/abnormality. In some embodiments, the bounding box corresponds to a real-world location associated with the classified defect or abnormality. In some embodiments, the mobile application uses the classified defect and associated bounding box to superimpose augmented reality elements indicated by the defect onto an image of the captured flange in real time, as described with respect to FIG. 2.

Figure 4:
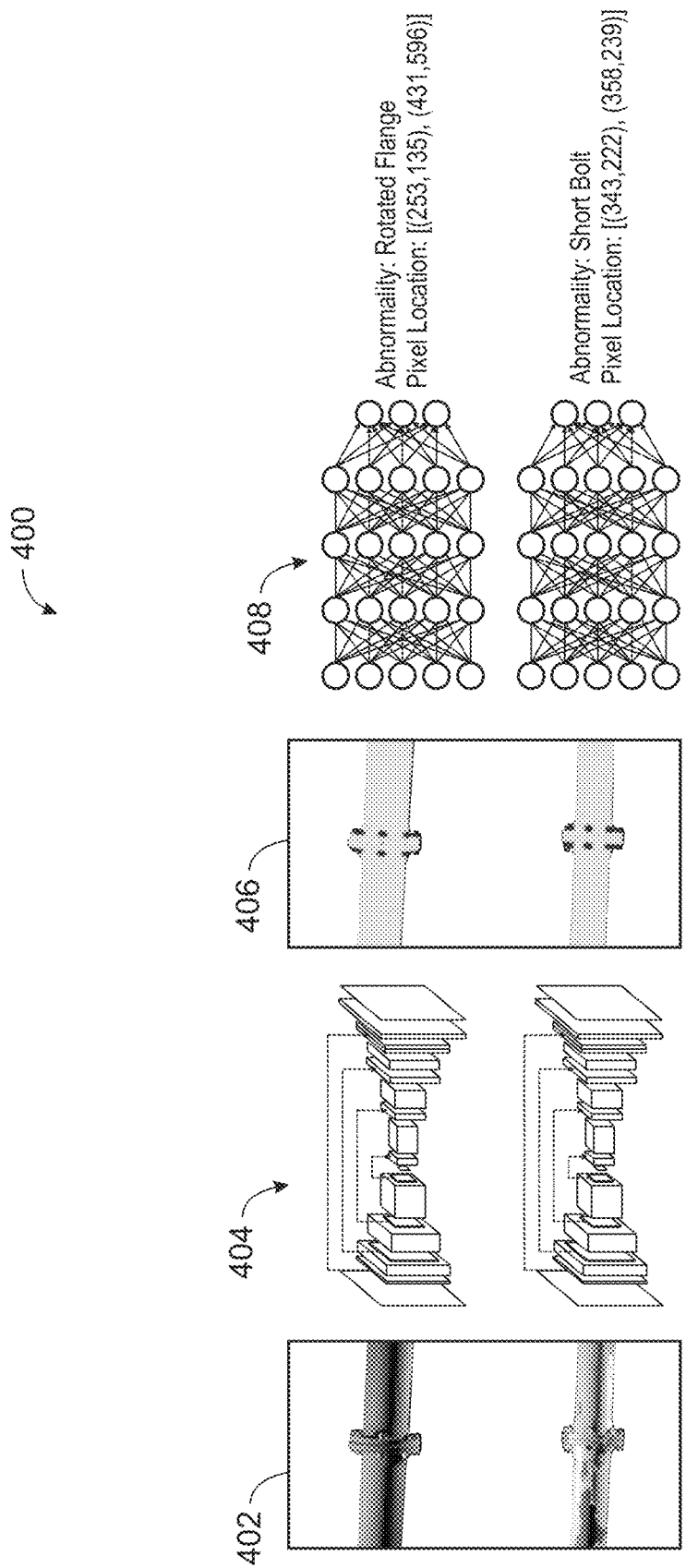
FIG. 4 is a block diagram of training a machine learning model for flange integrity classification in a two-part network.

FIG. 4 is a block diagram of training a machine learning model for flange integrity classification in a two-part network. In the example of FIG. 4, the two-part network includes image segmentation and training a machine learning model to classify flanges. In some embodiments, image segmentation is performed using a convolutional neural network architecture for fast and precise segmentation of the images, and object detection is performed using real time object detection. For example, image segmentation is structured similar to a U-Net model, and the object detection of the abnormalities is modeled using a You Only Look Once (YOLO) network.

Images of flanges are captured, as illustrated at block 402. In some embodiments, the machine learning models are trained using synthetic images as described with respect to FIG. 5. At block 404, the images are segmented. For example, for each flange image, the mobile application will first dissect and segment each pixel to a flange's component, such as flange body, screw, and bolt. At block 406, the segmented images are illustrated. In some embodiments, the segmented images include sub-images that correspond to the flange body, screw, and bolt. The segmented images are labeled using the condition of the flange-sub image. For example, bolts and screws are labeled according to conditions, such as being tight, loose, or missing. The flange body is labeled according to conditions, such as faces being aligned or misaligned.

The segmented images are input to machine learning models 408 for training. A classifier is trained used to detect and locate abnormalities within the flange using the segmented images. The trained machine learning models output flange integrity classifications. In examples, the classification includes defects/abnormalities of the flange and a bounding box associated with the defects/abnormalities. In some embodiments, the bounding box corresponds to a real-world location associated with the classified condition, including any defect or abnormality. In some embodiments, the mobile application uses the classified condition, including the defect or abnormality, and associated bounding box to superimpose augmented reality elements onto an image of the captured flange in real time, as described with respect to FIG. 2.

Figure 5:
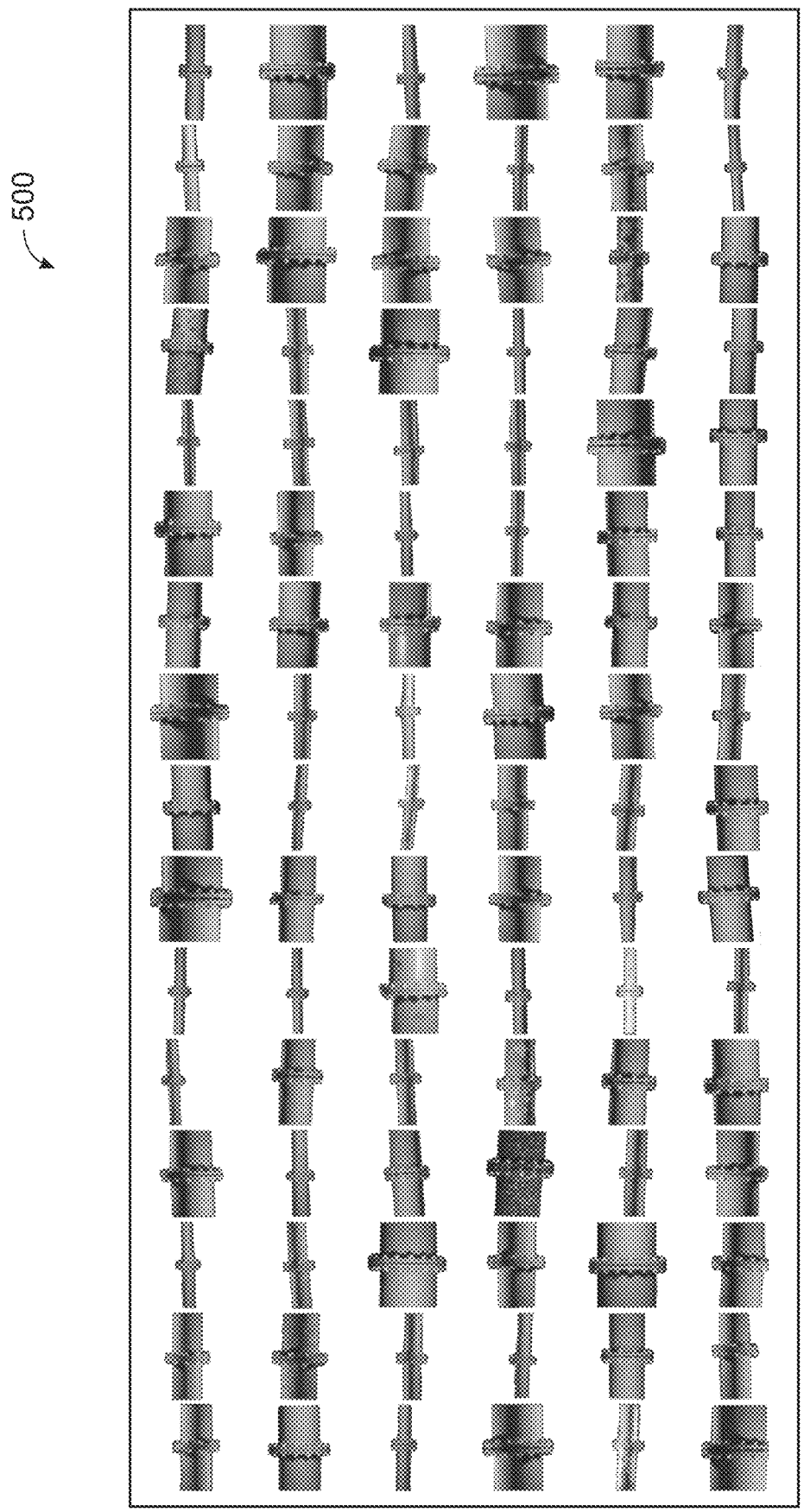
FIG. 5 is an illustration of synthetic flange images.

In examples, the machine learning models described with respect to FIGS. 3 and 4 are deep neural networks that require large labeled datasets in order to be properly trained to recognize patterns and generalize to new images not encountered previously. Images of flanges with labeled defects are scarce. Moreover, the images of flanges are typically manually labeled, which can be time consuming and tedious. FIG. 5 is an illustration of synthetic flanges 500. The synthetic flanges are generated using a sim-2-real transfer in machine learning. For example, simulations are used to generate synthetic flange images for the purpose of training machine learning models. The simulated data represents a wide variety of healthy and unhealthy flanges, and is representative of the real-world data. Machine learning models are trained by using the synthetic images, and the flange integrity classifications generated by machine learning models trained using synthetic images generate classifications of flange integrity using real-world images.

Simulated data is used to avoid the aforementioned manual labeling and due to the lack of real images of faulty flanges. Machine learning models typically require datasets with at least 5,000 images (and sometimes reach the millions). The simulated data is generated using three-dimensional (3D) modeling software (e.g., Blender). Many parameters of the simulated environment and gauge are randomly sampled in both the faulty and normal state to create a sufficiently large dataset to use in training the machine learning model.

In some embodiments, the machine learning models are trained and then converted to reduce a size of the trained machine learning models. Tablets typically use different architectures than devices used to train machine learning models. In some cases, tablets are computationally weaker than devices used to train machine learning models. Therefore, in order to execute the trained machine learning model on a tablet, it is converted into a format compatible with the tablet's architecture. These formats use datatypes that hold limited information. Moreover, some optimizations and trimming procedures are applied to the trained machine learning model to further reduce its size and inference time (e.g., time to process the image and provide an output). In examples, a machine learning library is used for training and inference of deep neural networks, while a lite version of the machine learning library executes the trained deep neural networks. The lite version of the machine learning library is executed on mobile or embedded devices. In some examples, the mobile or embedded devices have limited compute, memory, and power resources. In some embodiments, the Tensorflow is a library used in regular deep learning models on relatively complex devices while Tensorflow Lite is used for devices that have limited resources in terms of computation and memory.

In examples, the machine learning models are trained and then quantized to reduce a size of the trained machine learning models. In some embodiments, quantization constrains weights of the trained machine learning model to obtain a lightweight trained machine learning model that is operable using fewer compute resources when compared to the compute resources used to train the machine learning model. The mobile application is equipped with a dataset of all critical flanges in a given area, along with the computationally light version of the machine learning model for classification on the tablet. Accordingly, in some embodiments the lightweight trained machine learning model is deployed at an industrial tablet, such as industrial tablets 200 of FIG. 2. In some embodiments, the industrial tablet stores recorded data captured locally and transmits it to a server whenever a connection (e.g., data transmission on a network) is available.

The trained machine learning model classifies images of flanges captured by the industrial tablet. In some embodiments, the images of flanges captured by the industrial tablet are processed by the mobile application. In some embodiments, the mobile application identifies the type of flange. The flange can be identified based on a neck type, flange dimensions, etc. In some embodiments, the mobile application determines the specifications of the flange. Specifications of the flange include, for example, the number of bolts, neck spacing and vertical and horizontal misalignment. In some embodiments, the specifications are known and obtained from ASME 16.5 standards.

In some embodiments, the captured images are input to the trained machine learning models and the classified flange integrity output by the trained machine learning models is uploaded to a remote server or a database for further analysis and management. The database includes historical records of flange conditions and updated images of flanges with defects that can be reviewed and confirmed remotely by maintenance experts. In some embodiments, once faulty flanges are confirmed, a notification is transmitted to a corrective maintenance group to schedule maintenance jobs. In examples, the notification includes an identity, location, and determined condition (including any defects) of the flange.

In some embodiments, the images of flanges are captured for input to trained machine learning models located on a remote server. The industrial tablet can transmit the captured images wirelessly to the trained machine learning models installed on the server for analysis of the data collected. The tablet stores the images sequentially. In some embodiments, the images are transmitted from the tablet to a server where they are stored sequentially or in time series data and used for data analytics and modeling. Sequential or time-series data refers to readings that are stamped with the time of reading. For example, flange A had minor misalignment within acceptable tolerance on October 28, and the same flange had an even greater misalignment on November 25. Storing data in this fashion enables changes overtime to be monitored. Additionally, future conditions are predicted using the sequential data to determine if an intervention is needed.

In examples, in data analytics the server collects time-series statistical information about the health status of all the flanges in the plant. A server manager analyzes the flange defects and creates correlation maps between a defective flange and other defective flanges in the plant. In some embodiments, correlation relationships are created for defective flanges and other alarms/flags in the process. For example, a misaligned flange was detected in a plant, and after a couple of weeks pump in the same line as the misaligned flange was defected. Both incidents can be correlated for causality. In examples, during modeling flange images are used to enhance and improve a flange failure detection algorithm model. Using the analytics output, a prediction model is developed to predict future failures of flanges. In examples, the predicted future failures are used to schedule preventive maintenance.

In some embodiments, the flange data stored in the cloud system is accessed for further analysis, and also to check the history of the assets integrity. For example, personnel in a control room (e.g., central space where a large physical facility or physically dispersed service can be monitored and controlled) can access the flange data for further analysis. In some embodiments, a communication hub is established between an operator on location at the plant, and personnel in a remote control room. This will integrate multiple work-related necessary tools in one. In examples, the communication hub includes a server collecting data from different platforms and systems, and publishing results to a dashboard that can be accessed by operators and engineers. The communication hub connects operators in a central location and maintenance/operator craft on field in real-time utilizing digital capability like augmented reality and mobility to enhance two way interaction between different functional units of the operating facility. The communication hub enables integration of multiple user functionalities like work permits, equipment data sheets, real time operating parameters, piping and instrumentation diagram (P&ID)/3D models of plant, minimum maintenance requirements, job safety analysis (JSA) etc. In some embodiments, a backend analyzer system flags flanges that exhibit one or more defects, and sends a request to the maintenance crew to replace or correct the defective flange. The status of the defective flange is updated by the maintenance team once the flange is corrected. The communication hub links a flange clustering system and maintenance system together and display the data in one platform.

Figure 6:
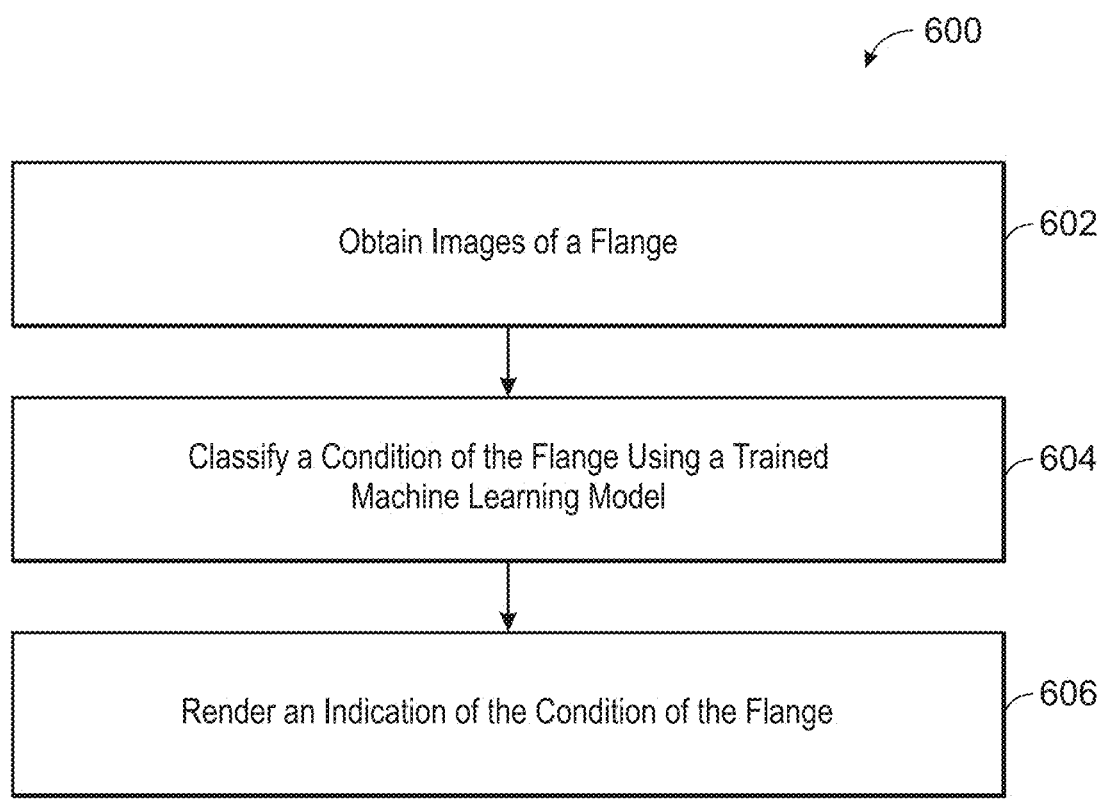
FIG. 6 is a process flow diagram of a process for flange integrity classification using a trained machine learning model.

FIG. 6 is a process flow diagram of a process for flange integrity classification using a trained machine learning model. In some embodiments, the machine learning models are trained as described with respect to FIGS. 3 and 4. The present techniques introduce a systematic and automated procedure to assess the integrity of flanges. An intrinsically safe tablet (e.g., tablets 200 of FIG. 2) pre-installed with inspection software (e.g., mobile application) prompts operators to visit a specific flange and obtain multiple images of the flange, and the flange integrity is classified. In examples, an intrinsically safe tablet is a device that can be used in industrial facility classified as hazardous. Hazardous areas, such as hydrocarbon facilities, can require any electrical device operated in constrained areas to be sealed in a way such that it cannot produce any sparks that could cause ignitions.

At block 602, images of a flange are obtained. An image of the flange is captured at a predetermined angle of image capture. In some embodiments, an industrial tablet (e.g., industrial tablet 202) includes one or more sensors, such as a camera sensor or gas sensor. The camera sensor is used to capture images of the flange. The gas sensor is used to detect hazardous or flammable gas plumes. In some embodiments, a mobile application executing on the industrial tablet prompts the operator to capture images at predetermined angles of image capture. The predetermined angle of image capture is based on a map of a system including flanges. In some embodiments, the operator is guided to the location of a flange via prompts from the mobile application. In examples, guidance to the location of the flange is based on a map of a system including flanges. In examples, guidance to the location of the flange is based on GPS information captured by the industrial tablet.

At block 604, a condition of the flange is classified using a trained machine learning model. In some embodiments, the trained machine learning model is trained as described with respect to FIGS. 3 and 4. For example, the trained machine learning model is a trained convolutional neural network (CNN) that obtains the images of the flange as input and outputs the classified condition, including a defect. In another example, the trained machine learning model includes segmenting the images of the flange; and image segmentation, and classifying the condition of the flange using a YOLO network. In some embodiments, the machine learning model is trained using a simulated dataset with synthetic flange images (e.g., dataset 500 of FIG. 5) that mimic real-world flange images. In some embodiments, the trained machine learning model is lightweight and deployed to an industrial tablet with light calculations used to output flange integrity classifications.

At block 606, an indication of the condition of the flange is rendered. In some embodiments, augmented reality elements corresponding to a defect associated with the condition of the flange are superimposed on an image of the flange in real time. The image of the flange is rendered via a display (e.g., displays 202 of FIG. 2) of the industrial tablet. In examples, the augmented reality elements correspond to a corrective measure responsive to the condition of the flange, and is superimposed on the image of the flange in real time. In examples, a bolt and corresponding nut are augmented reality elements superimposed on an image of the flange rendered on a display (e.g., display 202C of FIG. 2), illustrating inserting the bolt into the bolt holes of the flange and securing the nut to the bolt. In some embodiments, maintenance instructions and bolt tightening data (bolting patterns, torque and tensioning figures, procedures, techniques and recommended controlled bolting equipment) are rendered based on the condition of the flange. This will enable the user to correct the condition (e.g., correct the defect) at the time of inspection, if feasible.

In this manner, the present techniques enable classifications of flange integrity at a lower cost when compared to traditional techniques. The present techniques enable flange integrity detection and correction by an operator with little to no experience and training required. Moreover, the flange integrity classification according to the present techniques results in less time spent per inspection when compared to traditional techniques. The images captured for input to the trained machine learning model, and the classifications the condition of the flange establishes a complete and accurate record of the health of a system including multiple flanges. In some embodiments, the health of a system including multiple flanges is recorded through the detection of multiple anomalies or defects. This automated historical data is stored locally, at the industrial tablet. The automated historical data is transmitted to a cloud location or server when data transmission is available.

Figure 7:
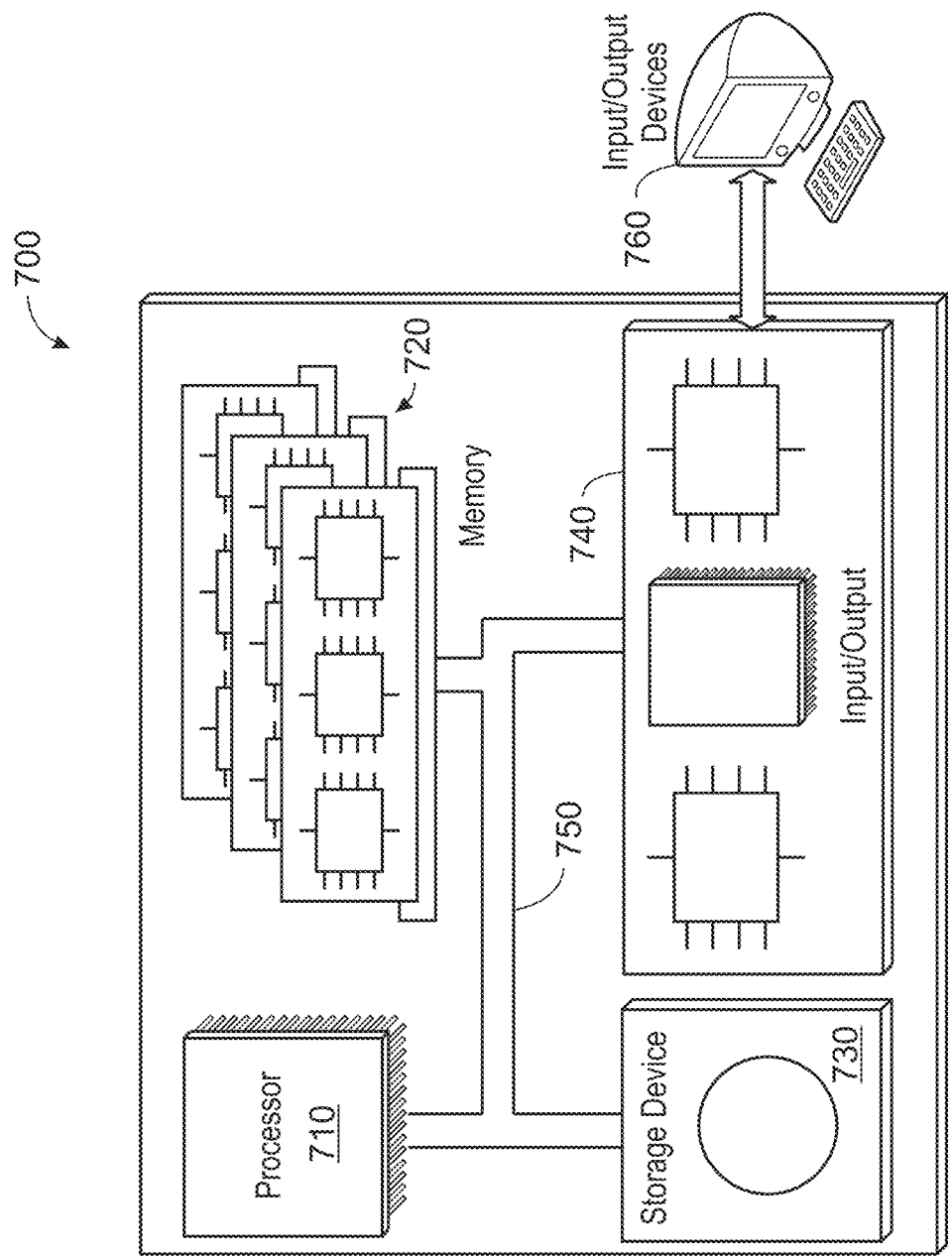
FIG. 7 is a schematic illustration of an example controller (or control system) for flange integrity classification using artificial intelligence according to the present disclosure.

FIG. 7 is a schematic illustration of an example controller 700 (or control system) for flange integrity classification using artificial intelligence according to the present disclosure. For example, the controller 700 may be operable according to the process 600 of FIG. 6, using the mobile application and included in an industrial tablet 200 of FIG. 2. The controller 700 is intended to include various forms of digital computers, such as printed circuit boards (PCB), processors, digital circuitry, or otherwise parts of a system for supply chain alert management. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output interface 740 communicatively coupled with input/output devices 760 (for example, displays, keyboards, measurement devices, sensors, valves, pumps). Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output interface 740.

The memory 720 stores information within the controller 700. In one implementation, the memory 720 is a computer-readable medium. In one implementation, the memory 720 is a volatile memory unit. In another implementation, the memory 720 is a nonvolatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, or a tape device.

The input/output interface 740 provides input/output operations for the controller 700. In one implementation, the input/output devices 760 includes a keyboard and/or pointing device. In another implementation, the input/output devices 760 includes a display unit for displaying graphical user interfaces.

There can be any number of controllers 700 associated with, or external to, a computer system containing controller 700, with each controller 700 communicating over a network. Further, the terms "client," "user," and other appropriate terminology can be used interchangeably, as appropriate, without departing from the scope of the present disclosure. Moreover, the present disclosure contemplates that many users can use one controller 700 and one user can use multiple controllers 700.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user.

For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship. Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method for flange integrity using artificial intelligence, the method comprising:
    obtaining, with one or more hardware processors, images of a flange, wherein the images are captured by rendering prompts that instruct a user to capture images at predetermined angles of image capture based on a map of a system comprising the flange, wherein a location of the flange is identified based on linear reference system data;
    classifying, with the one or more hardware processors, the flange as having at least one condition using a trained machine learning model, wherein the images captured at the predetermined angle of image capture are input to trained machine learning model, and the trained machine learning model outputs the at least one condition of the flange; and
    rendering, with the one or more hardware processors, an indication of the at least one condition of the flange at a display by a mobile application.

2. The computer implemented method of claim 1, wherein an augmented reality element corresponding to a defect associated with the at least one condition of the flange is superimposed on an image of the flange in real time.

3. The computer implemented method of claim 1, wherein an augmented reality element corresponding to a corrective measure responsive to a defect associated with the at least one condition of the flange is superimposed on an image of the flange in real time.

4. The computer implemented method of claim 1, wherein the trained machine learning model is a trained convolutional neural network (CNN) that obtains the images of the flange as input and outputs the at least one condition.

5. The computer implemented method of claim 1, wherein classifying the flange as having the at least one condition using the trained machine learning model further comprises:
- segmenting the images of the flange, wherein each pixel of a respective image is segmented into a flange component sub-images; and
- classifying at least one condition of the flange using a you only look once (YOLO) network, wherein the flange component sub-images are labeled according to respective conditions.

6. The computer implemented method of claim 1, wherein the indication of the at least one condition of the flange is a message that provides a type of defect observed at the flange.

7. The computer implemented method of claim 1, further comprising rendering instructions to correct a defect associated with the at least one condition, wherein the defect reduces an integrity of the flange and increases a likelihood of leaks at the flange.

8. The computer implemented method of claim 1, further comprising generating an alert in response to the at least one condition being a hazardous condition.

9. An apparatus comprising a non-transitory, computer readable, storage medium that stores instructions that, when executed by at least one processor, cause the at least one processor to perform operations comprising:
- obtaining images of a flange, wherein the images are captured by rendering prompts that instruct a user to capture images at a predetermined angle of image capture based on a map of a system comprising the flange, wherein a location of the flange is identified based on linear reference system data;
- classifying the flange as having at least one condition using a trained machine learning model wherein the images captured at the predetermined angle of image capture are input to trained machine learning model, and the trained machine learning model outputs the at least one condition of the flange; and
- rendering an indication of the at least one condition of the flange at a display by a mobile application.

10. The apparatus of claim 9, wherein an augmented reality element corresponding to a defect associated with the at least one condition of the flange is superimposed on an image of the flange in real time.

11. The apparatus of claim 9, wherein an augmented reality element corresponding to a corrective measure responsive to a defect associated with the at least one condition of the flange is superimposed on an image of the flange in real time.

12. The apparatus of claim 9, wherein the trained machine learning model is a trained convolutional neural network (CNN) that obtains the images of the flange as input and outputs the at least one condition.

13. The apparatus of claim 9, wherein classifying the flange as having the at least one condition using the trained machine learning model further comprises:
- segmenting the images of the flange, wherein each pixel of a respective image is segmented into a flange component sub-images; and
- classifying at least one condition of the flange using a you only look once (YOLO) network, wherein the flange component sub-images are labeled according to respective conditions.

14. The apparatus of claim 9, wherein the indication of the at least one condition of the flange is a message that provides a type of defect observed at the flange.

15. A system, comprising:
- one or more memory modules;
- one or more hardware processors communicably coupled to the one or more memory modules, the one or more hardware processors configured to execute instructions stored on the one or more memory modules to perform operations comprising:
- obtaining images of a flange, wherein the images are captured by rendering prompts that instruct a user to capture images at a predetermined angle of image capture based on a map of a system comprising the flange, wherein an industrial tablet guides capture of the images based on global positioning system (GPS) information captured by the industrial tablet and a location of the flange identified using linear reference system data;
- classifying the flange as having at least one condition using a trained machine learning model, wherein a machine learning model is trained to classify the flange using synthetic images, wherein the images captured at the predetermined angle of image capture are input to the trained machine learning model, and the trained machine learning model outputs the at least one condition of the flange; and
- rendering an indication of the at least one condition of the flange at a display by a mobile application.

16. The system of claim 15, wherein the machine learning model is trained to classify the at least one condition using synthetic images at a remote server, and a trained machine learning model is deployed to the industrial tablet.

17. The system of claim 15, wherein the trained machine learning model is quantized to generate a lightweight trained machine learning model prior to deploying the machine learning model to the industrial tablet.

18. The system of claim 15, wherein the trained machine learning model is a trained convolutional neural network (CNN) that obtains the images of the flange as input and outputs the at least one condition.

19. The system of claim 15, wherein classifying the flange as having the at least one condition using the trained machine learning model further comprises:
- segmenting the images of the flange, wherein each pixel of a respective image is segmented into a flange component sub-images; and
- classifying at least one condition of the flange using a you only look once (YOLO) network, wherein the flange component sub-images are labeled according to respective conditions.

20. The system of claim 15, wherein the indication of the at least one condition of the flange is a message that provides a type of defect observed at the flange.

21. The computer implemented method of claim 1, wherein the mobile application renders a prompt to acquire supplementary images of the flange when the images captured at the predetermined angle of image capture are of poor quality.

\* \* \* \* \*